US012633839B2

(12) United States Patent (10) Patent No.: US 12,633,839 B2
Takahara et al. (45) Date of Patent: May 19, 2026

(54) INVERTER CONTROL FOR RESTRAINING CURRENT FLOWING INTO DC CAPACITOR

(71) Applicant: Mitsubishi Electric Corporation, Tokyo (JP)

(72) Inventors: Takaaki Takahara, Tokyo (JP); Koichi Arisawa, Tokyo (JP); Keisuke Uemura, Tokyo (JP); Haruka Matsuo, Tokyo (JP); Koyo Matsuzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 267 days.

(21) Appl. No.: 18/044,096

(22) PCT Filed: Oct. 26, 2020

(86) PCT No.: PCT/JP2020/040132
§ 371 (c)(1),
(2) Date: Mar. 6, 2023

(87) PCT Pub. No.: WO2022/091185
PCT Pub. Date: May 5, 2022

(65) Prior Publication Data
US 2023/0378867 A1 Nov. 23, 2023

(51) Int. Cl.
| *H02M 5/458* | (2006.01) |
| *H02M 1/14* | (2006.01) |
| *H02M 1/42* | (2007.01) |

(52) U.S. Cl.
CPC ........... *H02M 5/4585* (2013.01); *H02M 1/14* (2013.01); *H02M 1/4225* (2013.01)

(58) Field of Classification Search
CPC ........................................ H02M 5/40–5/4585
See application file for complete search history.

(56) References Cited

U.S. PATENT DOCUMENTS 7,650,760 B2    1/2010  Nakata et al.
8,450,955 B2    5/2013  Ide et al.
(Continued)

FOREIGN PATENT DOCUMENTS

EP        2667502 A1    11/2013
EP        3537583 A1     9/2019
(Continued)

OTHER PUBLICATIONS

G. Grandi, J. Loncarski and O. Dordevic, "Analysis and Comparison of Peak-to-Peak Current Ripple in Two-Level and Multilevel PWM Inverters," in IEEE Transactions on Industrial Electronics, vol. 62, No. 5, pp. 2721-2730, May 2015 (Year: 2015).*
(Continued)

*Primary Examiner* — Peter M Novak
(74) *Attorney, Agent, or Firm* — Posz Law Group, PLC

(57) ABSTRACT

A power conversion apparatus includes a rectification and boost unit that rectifies a first alternating-current power supplied from a commercial power supply and boosts voltage of the first alternating-current power; a capacitor connected to output terminals of the rectification and boost unit; an inverter that is connected across the capacitor, converts power output from the rectification and boost unit and the capacitor into a second alternating-current power, and outputs the second alternating-current power to a load including a motor; and a control unit that performs operation control on the rectification and boost unit, and performs operation control on the inverter to cause the second alternating-current power that includes a pulsation based on a pulsation of power that flows into the capacitor from the rectification and boost unit to be output from the inverter to the load, to restrain a current that flows into the capacitor.

14 Claims, 7 Drawing Sheets

(56) References Cited

U.S. PATENT DOCUMENTS

| | | | | |
|---|---|---|---|---|
| 10,439,542 | B2 | 10/2019 | Taniguchi et al. | |
| 10,511,233 | B2 | 12/2019 | Ogawa et al. | |
| 10,903,755 | B2 | 1/2021 | Zhou et al. | |
| 11,196,356 | B2 | 12/2021 | Hiranuma et al. | |
| 11,682,992 | B2 | 6/2023 | Takahashi et al. | |
| 2012/0113693 | A1 | 5/2012 | Sekimoto et al. | |
| 2013/0300327 | A1 | 11/2013 | Sekimoto et al. | |
| 2014/0062354 | A1* | 3/2014 | Choi | H02M 5/4585 |
| | | | | 318/812 |
| 2015/0365038 | A1* | 12/2015 | Saha | H02M 7/53873 |
| | | | | 318/139 |
| 2016/0218624 | A1* | 7/2016 | Ishizeki | H02M 1/4225 |
| 2018/0145602 | A1* | 5/2018 | Wei | H02M 5/458 |
| 2019/0280606 | A1 | 9/2019 | Ono et al. | |
| 2020/0212818 | A1 | 7/2020 | Kataoka et al. | |
| 2023/0308025 | A1 | 9/2023 | Takahara et al. | |
| 2023/0336090 | A1 | 10/2023 | Takahara et al. | |
| 2024/0380345 | A1 | 11/2024 | Matsuo et al. | |
| 2025/0023497 | A1 | 1/2025 | Matsuo et al. | |
| 2025/0141340 | A1 | 5/2025 | Matsuo et al. | |
| 2025/0219559 | A1 | 7/2025 | Matsuo et al. | |
| 2025/0226738 | A1 | 7/2025 | Takahara et al. | |

FOREIGN PATENT DOCUMENTS

| | | | |
|---|---|---|---|
| JP | H02-269477 | A | 11/1990 |
| JP | H07-071805 | A | 3/1995 |
| JP | H10-248300 | A | 9/1998 |
| JP | 2001-037281 | A | 2/2001 |
| JP | 2002-051589 | A | 2/2002 |
| JP | 2004-343993 | A | 12/2004 |
| JP | 2005-020836 | A | 1/2005 |
| JP | 2010-288440 | A | 12/2010 |
| JP | 2011-205729 | A | 10/2011 |
| JP | 2012-044830 | A | 3/2012 |
| JP | 2012-157242 | A | 8/2012 |
| JP | 2012-196142 | A | 10/2012 |
| JP | 2016-073203 | A | 5/2016 |
| JP | 2017-046430 | A | 3/2017 |
| JP | 2017-055466 | A | 3/2017 |
| JP | 2018-014854 | A | 1/2018 |
| JP | 2019-083682 | A | 5/2019 |
| JP | 2019-161757 | A | 9/2019 |
| WO | 2020/234971 | A1 | 11/2020 |

OTHER PUBLICATIONS

International Search Report of the International Searching Authority mailed Dec. 1, 2020, issued in related International Application No. PCT/JP2020/040131 (and English machine translation).

Extended European Search Report mailed Nov. 6, 2023 in related European Patent Application No. 20959702.0.

Indian Office Action mailed Nov. 14, 2023 in related Indian Patent Application No. 202327013852.

Australian Office Action mailed Dec. 11, 2023 in related Australian Patent Application No. 2020475165.

International Search Report of the International Searching Authority mailed Dec. 1, 2020, issued in related International Application No. PCT/JP2020/040133 (and English machine translation).

Indian Office Action mailed Nov. 16, 2023 in related Indian Patent Application No. 202327013851.

Japanese Office Action mailed Dec. 26, 2023 in related Japanese Patent Application No. 2022-558619 (and English machine translation).

International Search Report of the International Searching Authority mailed Feb. 1, 2022, issued in related International Application No. PCT/JP2021/039878 (and English machine translation).

International Search Report of the International Searching Authority mailed Dec. 21, 2021, issued in related International Application No. PCT/JP2021/039841 (and English machine translation).

International Search Report of the International Searching Authority mailed Feb. 1, 2022, issued in related International Application No. PCT/JP2021/044502 (and English machine translation).

Indian Office Action mailed Nov. 24, 2023 in corresponding Indian Patent Application No. 202327017512 (and English translation).

International Search Report of the International Searching Authority mailed Dec. 1, 2020, issued in corresponding International Application No. PCT/JP2020/040132 (and English machine translation).

Chinese Office Action mailed Jun. 10, 2025 in the corresponding CN Application No. 202080106414.6 (English translation attached).

Office Action dated Jun. 20, 2025 issued in the related Chinese Patent Application No. 202080106184.3 (and English translation).

Office Action mailed on Jun. 23, 2025 issued in corresponding Chinese Patent Application No. 202080106399.5 (and English machine translation).

Office Action mailed on Jan. 31, 2026 issued in corresponding Chinese Patent Application No. 202080106414.6 (and partial English machine translation).

Hearing Notice mailed on Feb. 26, 2026 for the corresponding Indian Patent Application No. 202327013852.

* cited by examiner

START

S1

OBTAIN DETECTION VALUES

S2

PERFORM, ON INVERTER, OPERATION CONTROL THAT REDUCES CURRENT THAT FLOWS INTO SMOOTHING UNIT

S3

PERFORM POWER FACTOR IMPROVEMENT CONTROL FOR COMMERCIAL POWER SUPPLY AND AVERAGE VOLTAGE CONTROL ON CAPACITOR VOLTAGE THROUGH OPERATION CONTROL OF BOOST UNIT

END

400

91

PROCESSOR

92

MEMORY

INVERTER CONTROL FOR RESTRAINING CURRENT FLOWING INTO DC CAPACITOR

CROSS REFERENCE TO RELATED APPLICATION

This application is a U.S. national stage application of PCT/JP2020/040132 filed on Oct. 26, 2020, the contents of which are incorporated herein by reference.

TECHNICAL FIELD

The present disclosure relates to a power conversion apparatus that converts alternating-current power into desired power and also relates to a motor drive apparatus and a refrigeration cycle apparatus.

BACKGROUND

There is a conventional power conversion apparatus that converts alternating-current power supplied from an alternating-current power supply into desired alternating-current power and supplies the desired alternating-current power to a load in an air conditioner or another apparatus. For example, in a technique disclosed in Patent Literature 1 for a power conversion apparatus as a control apparatus for an air conditioner, alternating-current power supplied from an alternating-current power supply is rectified by a diode stack as a rectification unit and is further smoothed by a smoothing capacitor. The smoothed power is converted by an inverter composed of a plurality of switching elements into desired alternating-current power for output to a compressor motor as a load.

PATENT LITERATURE

Patent Literature 1: Japanese Patent Application Laid-Open No. H07-71805

However, a problem with the above-described conventional technique is that a large current flows into the smoothing capacitor, thus accelerating aging degradation of the smoothing capacitor. To address this problem, increasing capacitance of the smoothing capacitor for restraining variation of ripple in a capacitor voltage or using a smoothing capacitor with a greater tolerance to ripple-induced degradation is a conceivable method but causes increased costs of capacitor parts and causes the apparatus to have an increased size.

SUMMARY

The present disclosure has been made in view of the above, and an object of the present disclosure is to obtain a power conversion apparatus that enables its increase in size to be restrained while restraining degradation of a capacitor to be used for smoothing.

To solve the problem and achieve the object described above, a power conversion apparatus according to the present disclosure includes: a rectification and boost unit rectifying a first alternating-current power supplied from a commercial power supply and boosting a voltage of the first alternating-current power; a capacitor connected to output terminals of the rectification and boost unit; an inverter that is connected across the capacitor, converts power output from the rectification and boost unit and the capacitor into a second alternating-current power, and outputs the second alternating-current power to a load including a motor; and a control unit performing operation control on the rectification and boost unit, and performing operation control on the inverter to cause the second alternating-current power that includes a pulsation based on a pulsation of power that flows into the capacitor from the rectification and boost unit to be output from the inverter to the load, to restrain a current that flows into the capacitor.

The power conversion apparatus according to the present disclosure produces effects of enabling its increase in size to be restrained and restraining degradation of the capacitor that is used for smoothing.

DETAILED DESCRIPTION

With reference to the drawings, a detailed description is hereinafter provided of a power conversion apparatus, a motor drive apparatus, and a refrigeration cycle apparatus according to embodiments of the present disclosure.

First Embodiment

Figure 1:
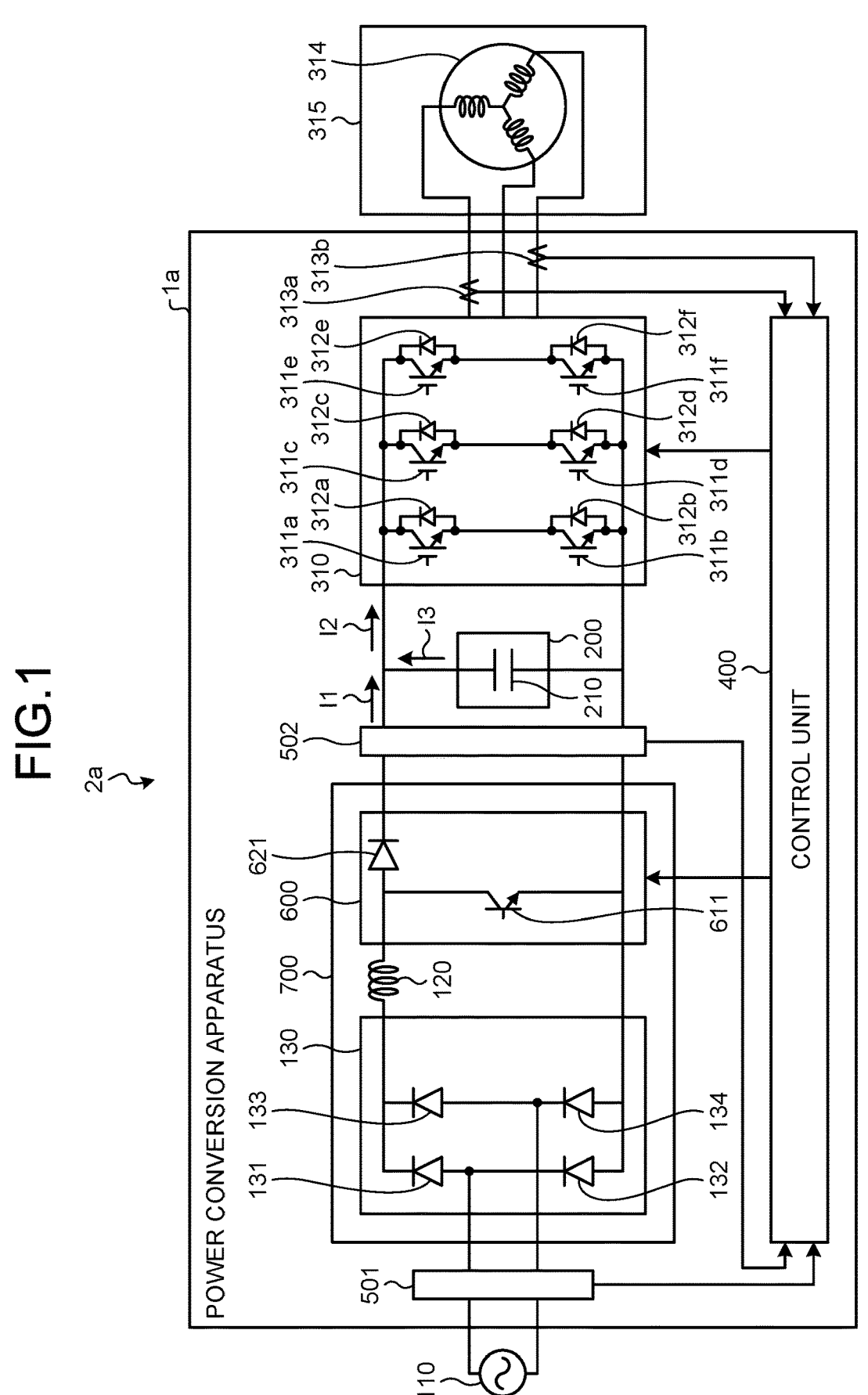
FIG. 1 is a diagram illustrating an exemplary configuration of a power conversion apparatus according to a first embodiment.

FIG. 1 is a diagram illustrating an exemplary configuration of a power conversion apparatus 1a according to a first embodiment. The power conversion apparatus 1a is connected to a commercial power supply 110 and a compressor 315. The power conversion apparatus 1a converts a first alternating-current power at a power supply voltage Vs that is supplied from the commercial power supply 110 into a second alternating-current power having a desired amplitude and a desired phase and supplies the second alternating-current power to the compressor 315. The power conversion apparatus 1a includes a voltage and current detection unit 501, a rectification unit 130, a reactor 120, a boost unit 600, a voltage detection unit 502, a smoothing unit 200, an inverter 310, current detection units 313a and 313b, and a control unit 400. The rectification unit 130, the reactor 120, and the boost unit 600 of the power conversion apparatus 1a compose a rectification and boost unit 700. The power conversion apparatus 1a and a motor 314 included in the compressor 315 compose a motor drive apparatus 2a.

The voltage and current detection unit 501 detects a voltage value and a current value of the first alternating-current power at the power supply voltage Vs that is supplied from the commercial power supply 110 and outputs the detected voltage and current values to the control unit 400. The rectification unit 130 includes a bridge circuit composed of rectifier elements 131 to 134, and rectifies the first alternating-current power at the power supply voltage Vs that is supplied from the commercial power supply 110 and outputs the power rectified. The rectification unit 130 performs full-wave rectification. The reactor 120 is connected between the rectification unit 130 and the boost unit 600. The boost unit 600 includes a switching element 611 and a rectifier element 621. The boost unit 600 turns on and off the switching element 611 under control of the control unit 400, boosts the power output from the rectification unit 130, and outputs the boosted power to the smoothing unit 200. In the present embodiment, the control unit 400 performs on the boost unit 600 full pulse amplitude modulation (PAM) control that continuously switches the switching element 611. With the boost unit 600, the power conversion apparatus 1a performs power factor improvement control for the commercial power supply 110 and causes a capacitor voltage Vdc across a capacitor 210 of the smoothing unit 200 to be higher than the power supply voltage Vs. With the rectification unit 130 and the boost unit 600, the rectification and boost unit 700 rectifies the first alternating-current power supplied from the commercial power supply 110 and boosts the voltage of the first alternating-current power supplied from the commercial power supply 110. In the rectification and boost unit 700 according to the present embodiment, the rectification unit 130 and the boost unit 600 are connected in series.

The voltage detection unit 502 detects a voltage value of the power boosted by the boost unit 600 and outputs the detected voltage value to the control unit 400. The smoothing unit 200 is connected to output terminals of the boost unit 600 via the voltage detection unit 502. The smoothing unit 200 includes a capacitor 210 as a smoothing element and smooths the power boosted by the boost unit 600. Examples of the capacitor 210 include an electrolytic capacitor and a film capacitor, among others. The capacitor 210 has such capacitance as to smooth the power rectified by the rectification unit 130. The smoothing causes voltage across the capacitor 210 to not assume a full-wave rectified waveform of the commercial power supply 110, but a waveform that includes a direct-current component with voltage ripple based on a frequency of the commercial power supply 110 superimposed and does not pulsate significantly. A main frequency component of this voltage ripple is a component that is double the frequency of the power supply voltage Vs when the commercial power supply 110 is single-phase or six times the frequency of the power supply voltage Vs when the commercial power supply 110 is three-phase. If the power input from the commercial power supply 110 and the power that is output from the inverter 310 do not change, the amplitude of this voltage ripple is determined by the capacitance of the capacitor 210. For example, the voltage ripple generated across the capacitor 210 pulsates in a range such that its maximum value is less than twice its minimum value.

The inverter 310 is connected across the smoothing unit 200, namely the capacitor 210. The inverter 310 includes switching elements 311a to 311f and freewheeling diodes 312a to 312f. The inverter 310 turns on and off the switching elements 311a to 311f under control of the control unit 400, converts power output from the rectification and boost unit 700 and the smoothing unit 200 into the second alternating-current power that has the desired amplitude and the desired phase, and outputs the second alternating-current power to the compressor 315. Each of the current detection units 313a and 313b detects a value of one of three phase currents that are output from the inverter 310 and outputs the detected current value to the control unit 400. By obtaining the values of the two phase currents of the values of three phase currents that are output from the inverter 310, the control unit 400 is enabled to calculate a value of a remaining one of the three phase currents that are output from the inverter 310. The compressor 315 is a load including the motor 314 that drives a compression mechanism. The motor 314 rotates according to the amplitude and the phase of the second alternating-current power supplied from the inverter 310, effecting compression operation. If, for example, the compressor 315 is a hermetic compressor that is used in an air conditioner or another apparatus, load torque of the compressor 315 can often be considered a constant torque load.

The arrangement of the configurations that is illustrated in FIG. 1 is an example. The power conversion apparatus 1a is not limited to the example arrangement of the configurations that is illustrated in FIG. 1. The rectification and boost unit 700 does not have to include the reactor 120, depending where the reactor 120 is disposed. In a description below, the voltage and current detection unit 501, the voltage detection unit 502, and the current detection units 313a and 313b may all be referred to as the detection units. The voltage and current values detected by the voltage and current detection unit 501, the voltage value detected by the voltage detection unit 502, and the current values detected by the current detection units 313a and 313b may be referred to as the detection values.

The control unit 400 obtains the voltage and current values of the first alternating-current power at the power supply voltage Vs from the voltage and current detection unit 501, the voltage value of the power boosted by the boost unit 600 from the voltage detection unit 502, and the current values of the second alternating-current power with the desired amplitude and the desired phase that has been obtained as a result of the conversion by the inverter 310 from the current detection units 313a and 313b. The control unit 400 uses the detection values detected by the detection units in controlling the operation of the boost unit 600 of the rectification and boost unit 700 or, more specifically, the on and off switching of the switching element 611 of the boost unit 600. Moreover, the control unit 400 uses the detection values detected by the detection units in controlling the operation of the inverter 310 or, more specifically, the on and off switching of the switching elements 311a to 311f of the inverter 310. In the present embodiment, the control unit 400 controls the operation of the rectification and boost unit 700. The control unit 400 performs the power factor improvement control on the first alternating-current power supplied from the commercial power supply 110 and average voltage control for the capacitor 210 of the smoothing unit 200 through the operation control of the rectification and boost unit 700. Moreover, the control unit 400 performs the operation control on the inverter 310 to cause the second alternating-current power that includes a pulsation based on a pulsation of the power that flows into the capacitor 210 of the smoothing unit 200 from the rectification unit 130 to be output from the inverter 310 to the compressor 315, which is the load. The pulsation based on the pulsation of the power that flows into the capacitor 210 of the smoothing unit 200 refers to, for example, a pulsation that changes depending on, for example, a frequency of the pulsation of the power that flows into the capacitor 210 of the smoothing unit 200. In this way, the control unit 400 restrains a current that flows into the capacitor 210 of the smoothing unit 200. The control unit 400 does not have to use all the detection values obtained from the detection units. The control unit 400 may use part of the detection values in the control.

A description is provided next of how the control unit 400 of the power conversion apparatus 1a operates. In the power conversion apparatus 1a according to the present embodiment, a load that is generated by the inverter 310 and the compressor 315 can be regarded as the constant load. A description below is based on the assumption that a constant current load is connected to the smoothing unit 200 when viewed in terms of a current that is output from the smoothing unit 200. Herein, as illustrated in FIG. 1, a current that flows from the boost unit 600 refers to the current I1, a current that flows into the inverter 310 refers to the current I2, and the current that flows from the smoothing unit 200 refers to the current I3. The current I2 is the current as a combination of the current I1 and the current I3. The current I3 can be expressed as a difference between the current I2 and the current I1, that is to say, the current I2 minus the current I1. The current I3 has a positive direction in a discharge direction of the smoothing unit 200 and a negative direction in a charge direction of the smoothing unit 200. In other words, there are cases where the current flows into and flows out of the smoothing unit 200.

Figure 2:
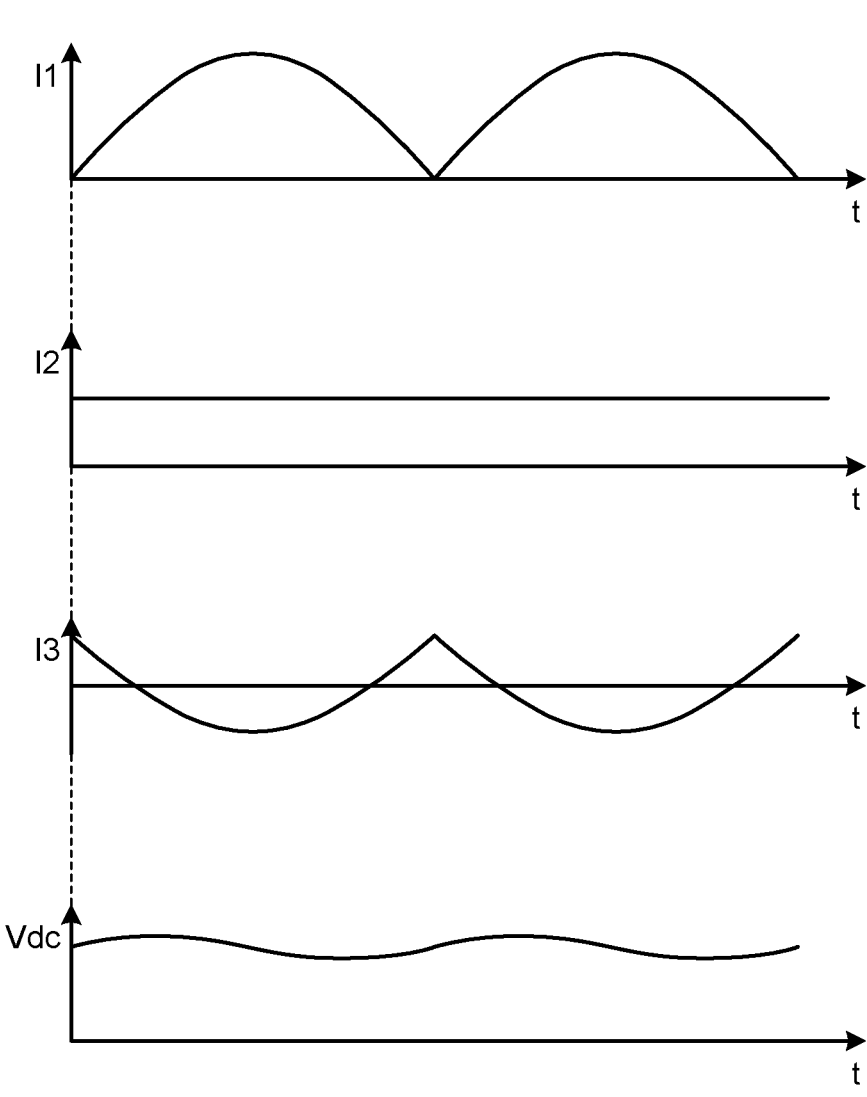
FIG. 2 is a diagram illustrating examples of currents as well as an example of a capacitor voltage across a capacitor in a smoothing unit in a comparative example in which the current output from a boost unit has been smoothed by the smoothing unit, causing the current that flows into an inverter to be constant.

FIG. 2 is a diagram illustrating examples of the currents I1 to I3 and an example of the capacitor voltage Vdc across the capacitor 210 in the smoothing unit 200 in a comparative example in which the current output from the boost unit 600 has been smoothed by the smoothing unit 200, causing the current I2 that flows into the inverter 310 to be constant. The current I1, the current I2, the current I3, and the capacitor voltage Vdc that is generated across the capacitor 210 in accordance with the current I3 are illustrated from the top in this order. A vertical axis for each of the currents I1, I2, and I3 represents the current value, and a vertical axis for the capacitor voltage Vdc represents the voltage value. Every horizontal axis represents time t. Although a carrier component of the inverter 310 is actually superimposed on the currents I2 and I3, this is omitted here. The same applies to what follows. As illustrated in FIG. 2, if the current I1 that flows from the boost unit 600 has been smoothed enough by the smoothing unit 200 in the power conversion apparatus 1a, the current I2 that flows into the inverter 310 becomes a constant current value. However, the current I3 that flows into the capacitor 210 of the smoothing unit 200 is large and causes degradation of the capacitor 210. Therefore, the control unit 400 of the power conversion apparatus 1a according to the present embodiment controls the current I2 that flows into the inverter 310, that is to say, controls the operation of the inverter 310 in order to reduce the current I3 that flows into the smoothing unit 200.

Figure 3:
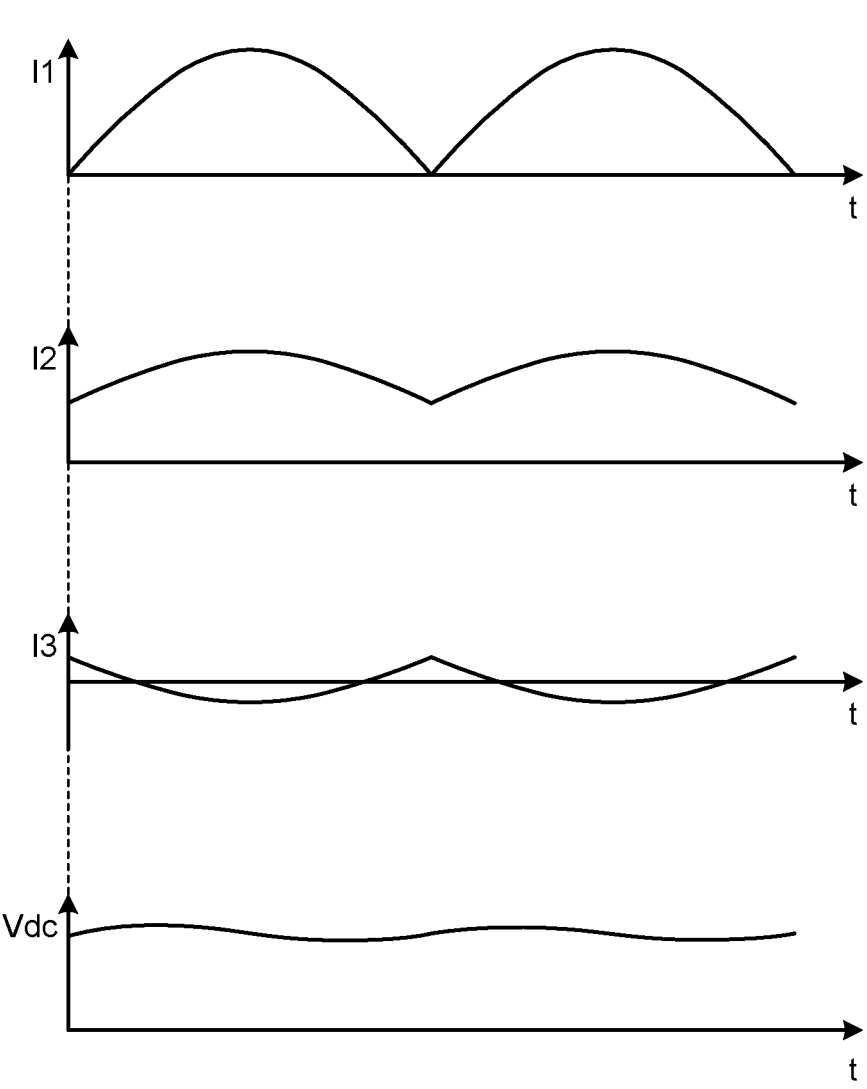
FIG. 3 is a diagram illustrating examples of the currents as well as an example of the capacitor voltage across the capacitor in the smoothing unit when a control unit of the power conversion apparatus according to the first embodiment has reduced the current that flows into the smoothing unit through operation control of the inverter.

FIG. 3 is a diagram illustrating examples of the currents I1 to I3 and an example of the capacitor voltage Vdc across the capacitor 210 in the smoothing unit 200 when the control unit 400 of the power conversion apparatus 1a according to the first embodiment has reduced the current I3 that flows into the smoothing unit 200 through the operation control of the inverter 310. The current I1, the current I2, the current I3, and the capacitor voltage Vdc that is generated across the capacitor 210 in accordance with the current I3 are illustrated from the top in this order. A vertical axis for each of the currents I1, I2, and I3 represents the current value, and a vertical axis for the capacitor voltage Vdc represents the voltage value. Every horizontal axis represents time t. Through the operation control of the inverter 310 to cause the current I2, such as illustrated in FIG. 3, to flow into the inverter 310, the control unit 400 of the power conversion apparatus 1a is capable of reducing frequency components in the current that flows into the smoothing unit 200 from the boost unit 600, thus reducing the current I3 that flows into the smoothing unit 200, as compared with the example of FIG. 2. Specifically, the control unit 400 performs the operation control on the inverter 310 to cause the current I2 that includes a pulsating current whose main component is a frequency component of the current I1 to flow into the inverter 310.

The frequency component of the current I1 is determined by a frequency of an alternating current supplied from the commercial power supply 110, the configuration of the rectification unit 130, and a switching speed of the switching element 611 in the boost unit 600. Therefore, the control unit 400 enables a frequency component of the pulsating current that is superimposed on the current I2 to be a component having a predetermined amplitude and a predetermined phase. The frequency component of the pulsating current that is superimposed on the current I2 has a waveform similar to that of the frequency component of the current I1. As the control unit 400 brings the frequency component of the pulsating current that is superimposed on the current I2 closer to the frequency component of the current I1, the control unit 400 enables the current I3 that flows into the smoothing unit 200 to reduce and enables a pulsating voltage that is generated in the capacitor voltage Vdc to reduce.

The pulsation control of the current that flows into the inverter 310 by the control unit 400 through the operation control of the inverter 310 is equivalent to pulsation control of the second alternating-current power that is output from the inverter 310 to the compressor 315. Through the operation control of the inverter 310, the control unit 400 causes the pulsation included in the second alternating-current power that is output from the inverter 310 to become smaller than the pulsation of the power that is output from the rectification and boost unit 700. In order for the voltage ripple of the capacitor voltage Vdc, namely the voltage ripple generated across the capacitor 210 to be smaller than voltage ripple that will be generated across the capacitor 210 if the second alternating-current power that is output from the inverter 310 does not include the pulsation based on the pulsation of the power that flows into the capacitor 210, the control unit 400 performs amplitude and phase control on the pulsation included in the second alternating-current power that is output from the inverter 310. The case where the second alternating-current power that is output from the inverter 310 does not include the pulsation based on the pulsation of the power that flows into the capacitor 210 refers to control, such as illustrated in FIG. 2.

The alternating current that is supplied from the commercial power supply 110 is not particularly limited and may be single-phase or three-phase. The control unit 400 only has to determine the frequency component of the pulsating current that is superimposed on the current I2 on the basis of the first alternating-current power that is supplied from the commercial power supply 110. Specifically, the control unit 400 controls a pulsating waveform of the current I2 that flows into the inverter 310 to a shape obtained by adding a direct-current component to a pulsating waveform whose main component is a frequency component that is double a frequency of the first alternating-current power if the first alternating-current power that is supplied from the commercial power supply 110 is single-phase or six times the frequency of the first alternating-current power if the first alternating-current power that is supplied from the commercial power supply 110 is three-phase. The pulsating waveform is, for example, a shape defined by absolute values of a sine wave or sine wave-shaped. In this case, the control unit 400 may add at least one of frequency components that are integer multiples of a frequency of the sine wave as a prespecified amplitude to the pulsating waveform. The pulsating waveform may be rectangular wave-shaped or triangular-wave shaped. In this case, the control unit 400 may set amplitude and phase of the pulsating waveform as prespecified values.

The control unit 400 may use the voltage across the capacitor 210 or the current flowing into the capacitor 210 in calculating a pulsating quantity of the pulsation to be included in the second alternating-current power, which is output from the inverter 310, or may use the voltage or the current of the first alternating-current power supplied from the commercial power supply 110 in calculating a pulsating quantity of the pulsation to be included in the second alternating-current power, which is output from the inverter 310.

When causing, through the control of the inverter 310, the second alternating-current power that includes a frequency component different from a frequency component of the first alternating-current power that is supplied from the commercial power supply 110 to be output from the inverter 310 to the compressor 315, the control unit 400 may superimpose, on a drive signal that turns on and off the switching element 611 of the boost unit 600, the frequency component to be included in the second alternating-current power that is output from the inverter 310 to the compressor 315. In other words, the control unit 400 performs the operation control on the rectification and boost unit 700 or, more specifically, the operation control on the switching element 611 of the boost unit 600 to cause the power that includes the variable frequency component among power pulsations of the second alternating-current power that is output from the inverter 310 to the compressor 315 to be output from the rectification and boost unit 700. The variable frequency component is other than the frequency component that is double the frequency of the first alternating-current power if the first alternating-current power that is supplied from the commercial power supply 110 is single-phase or six times the frequency of the first alternating-current power if the first alternating-current power that is supplied from the commercial power supply 110 is three-phase. The control unit 400 may control the variable frequency component with a command value for the commercial power supply 110. The variable frequency component may be controlled by the control unit 400 not to be up to a 40th order component that is an integer multiple of the frequency of the first alternating-current power supplied from the commercial power supply 110 or to be less than or equal to a specified value (for example, a desired standard value).

Figure 4:
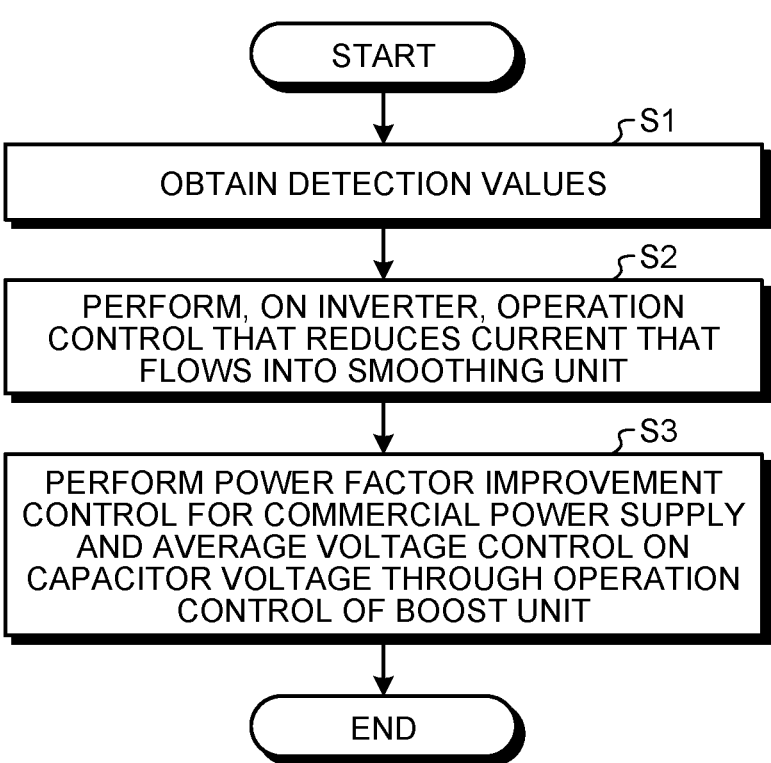
FIG. 4 is a flowchart illustrating the operation of the control unit of the power conversion apparatus according to the first embodiment.

With reference to a flowchart, a description is provided of the operation of the control unit 400. FIG. 4 is a flowchart illustrating the operation of the control unit 400 of the power conversion apparatus 1a according to the first embodiment. The control unit 400 obtains detection values from the detection units of the power conversion apparatus 1a (step S1). On the basis of the obtained detection values, the control unit 400 performs, on the inverter 310, the operation control that reduces the current I3 that flows into the smoothing unit 200 (step S2). On the basis of the obtained detection values, the control unit 400 performs the operation control on the boost unit 600 to perform the power factor improvement control for the commercial power supply 110 and the average voltage control on the capacitor voltage Vdc across the capacitor 210 of the smoothing unit 200 (step S3).

Figure 5:
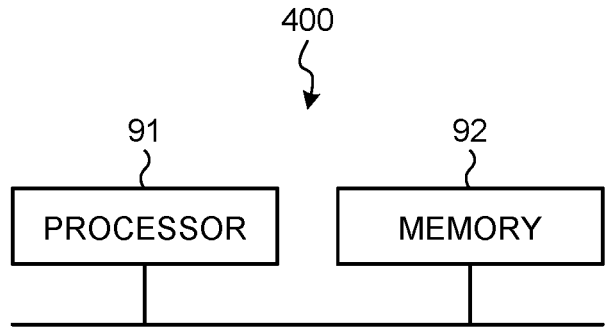
FIG. 5 is a diagram illustrating an example of a hardware configuration that implements the control unit of the power conversion apparatus according to the first embodiment.

A description is provided next of a hardware configuration of the control unit 400 of the power conversion apparatus 1a. FIG. 5 is a diagram illustrating an example of the hardware configuration that implements the control unit 400 of the power conversion apparatus 1a according to the first embodiment. The control unit 400 is implemented with a processor 91 and a memory 92.

The processor 91 is a central processing unit (CPU) (also referred to as a processing unit, an arithmetic unit, a microprocessor, a microcomputer, a processor, or a digital signal processor (DSP)) or a system large-scale integration (LSI). The memory 92 is, for example, a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark). The memory 92 is not limited to these and may be a magnetic disk, an optical disk, a compact disk, a mini disk, or a digital versatile disc (DVD).

As described above, according to the present embodiment, the control unit 400 of the power conversion apparatus 1a performs the operation control on the inverter 310 on the basis of the detection values obtained from the detection units to superimpose the pulsating frequency component based on the frequency component of the current I1 flowing from the rectification unit 130 on the current I2 that flows into the inverter 310, thus reducing the current I3 that flows into the smoothing unit 200. Since the current I3 that flows into the smoothing unit 200 is reduced thus, the power conversion apparatus 1a is enabled to use a capacitor with a smaller tolerance to ripple current than in a case where the control according to the present embodiment is not performed. Since the power conversion apparatus 1a reduces the pulsating voltage in the capacitor voltage Vdc, the capacitor 210 to be installed is enabled to have a smaller capacitance than in the case where the control according to the present embodiment is not performed. In cases where, for example, the smoothing unit 200 includes a plurality of the capacitors 210, the power conversion apparatus 1a enables the smoothing unit 200 to have a reduced number of capacitors 210.

Since the pulsation included in the second alternating-current power is caused, through the operation control of the inverter 310, to become smaller than the pulsation of the power that is output from the rectification and boost unit 700, the power conversion apparatus 1a enables the pulsating component superimposed on the current I2 that flows into the inverter 310 to be restrained from becoming excessive. Superimposing the pulsating component increases an effective value of the current that passes through, for example, the inverter 310 and the motor 314 compared to a state in which the pulsating component is not superimposed. However, the pulsating component to be superimposed is restrained from becoming excessive, thus enabling provision of a system that restrains current capacity of the inverter 310, loss increase in the inverter 310 and loss increase in the motor 314, among others.

With the control according to the present embodiment, the power conversion apparatus 1a is capable of restraining vibration of the compressor 315 that is caused by the pulsation of the current I2.

Since the boosting by the boost unit 600 increases the capacitor voltage Vdc across the capacitor 210, the power conversion apparatus 1a enables the inverter 310 to have a wider output voltage range. The control unit 400 of the power conversion apparatus 1a superimposes the pulsating frequency component that is included in the second alternating-current power to be output from the inverter 310 on the drive signal for the switching element 611 of the boost unit 600. In this way, the control unit 400 is capable of reducing pulsations of the current I3 and the capacitor voltage Vdc that are caused by this frequency component.

Second Embodiment

In a second embodiment, a description is provided of a power conversion apparatus including a rectification and boost unit that has a circuit configuration different from that of the rectification and boost unit 700 of the power conversion apparatus 1a according to the first embodiment.

Figure 6:
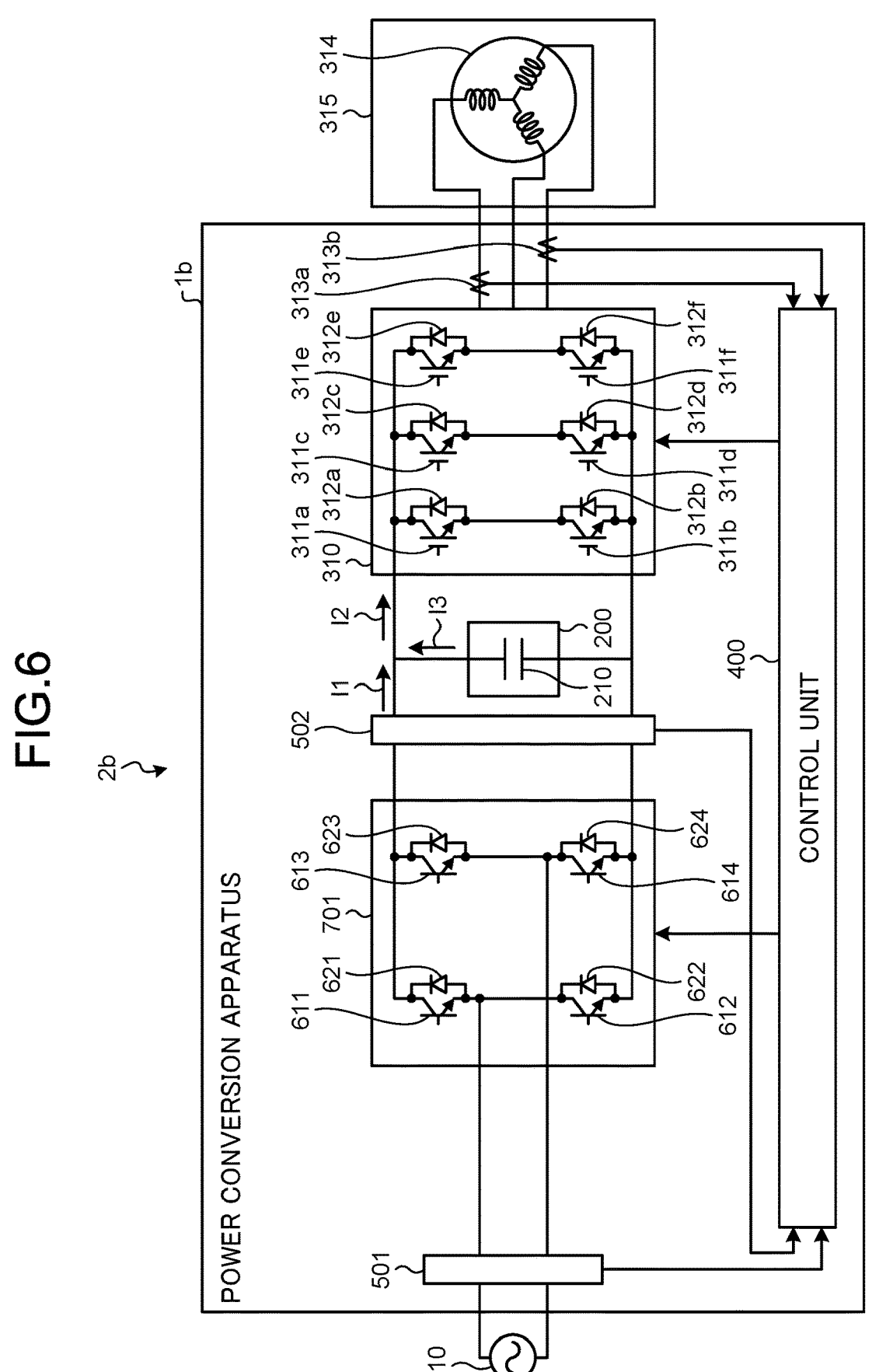
FIG. 6 is a diagram illustrating an exemplary configuration of a power conversion apparatus according to a second embodiment.

FIG. 6 is a diagram illustrating an exemplary configuration of the power conversion apparatus 1b according to the second embodiment. Compared with the power conversion apparatus 1a according to the first embodiment illustrated in FIG. 1, the power conversion apparatus 1b has the rectification and boost unit 701 in place of the rectification and boost unit 700. The power conversion apparatus 1b and the motor 314 that is included in the compressor 315 compose a motor drive apparatus 2b. The rectification and boost unit 701 includes the switching elements 611 to 614, and those rectifier elements 621 to 624 that are connected in parallel with the switching elements 611 to 614, respectively. The rectification and boost unit 701 turns on and off the switching elements 611 to 614 under control of the control unit 400, rectifies and boosts a first alternating-current power output from the commercial power supply 110, and outputs the boosted power to the smoothing unit 200. In the present embodiment, the control unit 400 performs on the rectification and boost unit 701 full PAM control that continuously switches the switching elements 611 to 614. With the rectification and boost unit 701, the power conversion apparatus 1b performs power factor improvement control for the commercial power supply 110 and causes the capacitor voltage Vdc across the capacitor 210 of the smoothing unit 200 to be higher than the power supply voltage Vs.

The control unit 400 obtains a voltage value and a current value of the first alternating-current power at the power supply voltage Vs from the voltage and current detection unit 501, a voltage value of the power boosted by the rectification and boost unit 701 from the voltage detection unit 502, and current values of a second alternating-current power with a desired amplitude and a desired phase that has been obtained as a result of conversion by the inverter 310 from the current detection units 313a and 313b. The control unit 400 uses the detection values detected by the detection units in controlling the operation of the inverter 310 or, more specifically, the on and off switching of the switching elements 311a to 311f of the inverter 310. Moreover, the control unit 400 uses the detection values detected by the detection units in controlling the operation of the rectification and boost unit 701 or, more specifically, the on and off switching of the switching elements 611 to 614 of the rectification and boost unit 701. By performing the operation controls on the rectification and boost unit 701 and the inverter 310, the control unit 400 obtains the same effects as described in the first embodiment.

The power conversion apparatus 1b otherwise operates similarly to the power conversion apparatus 1a according to the first embodiment. In this case, the power conversion apparatus 1b is also capable of obtaining the same effects as the power conversion apparatus 1a according to the first embodiment.

Third Embodiment

In a third embodiment, a description is provided of a power conversion apparatus including a rectification and boost unit that has a circuit configuration different from the circuit configurations of the rectification and boost unit 700 of the power conversion apparatus 1a according to the first embodiment and the rectification and boost unit 701 of the power conversion apparatus 1b according to the second embodiment.

Figure 7:
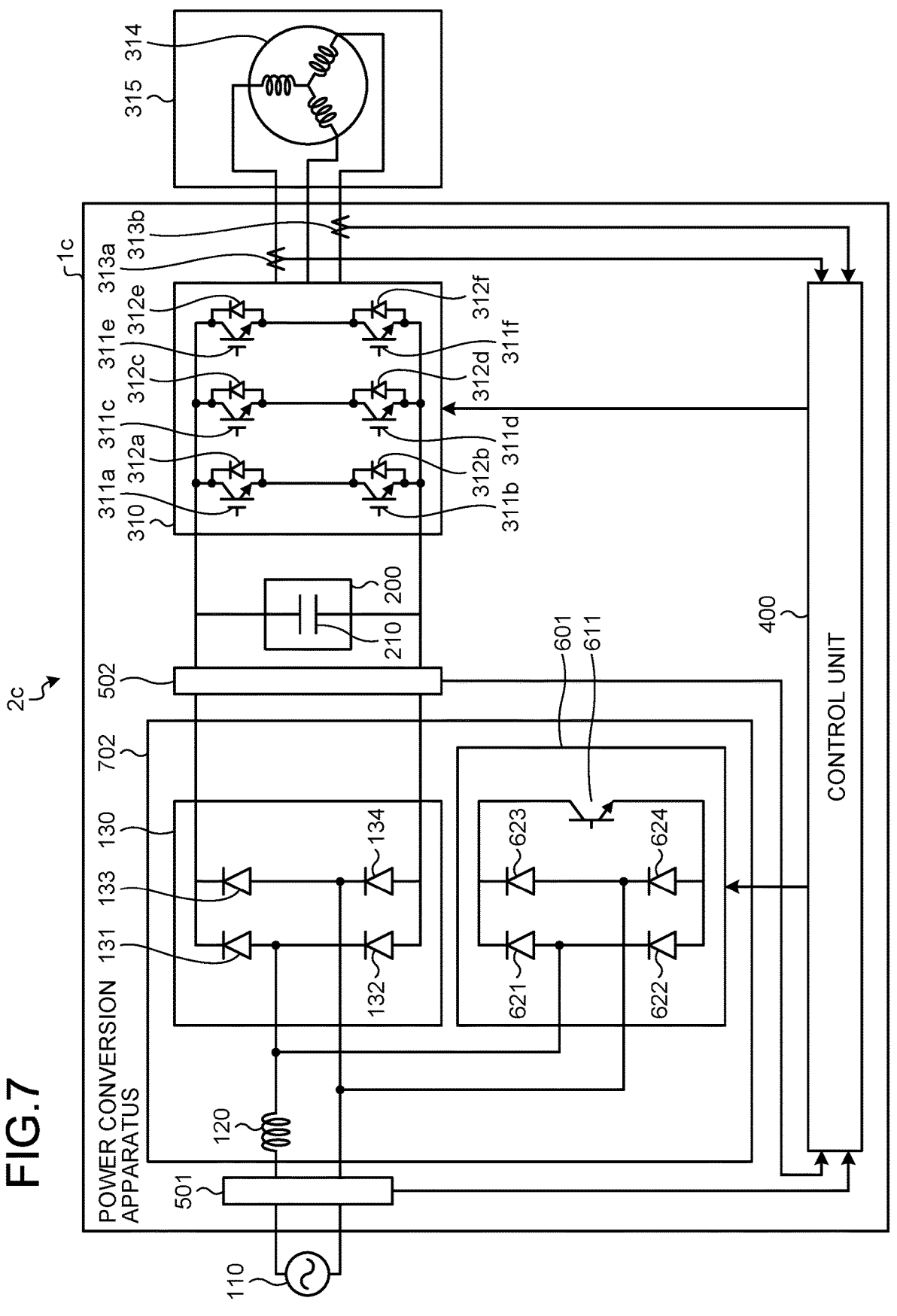
FIG. 7 is a diagram illustrating an exemplary configuration of a power conversion apparatus according to a third embodiment.

FIG. 7 is a diagram illustrating an exemplary configuration of the power conversion apparatus 1c according to the third embodiment. Compared with the power conversion apparatus 1a according to the first embodiment illustrated in FIG. 1, the power conversion apparatus 1c has the rectification and boost unit 702 in place of the rectification and boost unit 700. The power conversion apparatus 1c and the motor 314 that is included in the compressor 315 compose a motor drive apparatus 2c. The rectification and boost unit 702 includes the reactor 120, the rectification unit 130, and a boost unit 601. While the boost unit 600 is connected downstream of the rectification unit 130, that is to say, in series with the rectification unit 130 in the power conversion apparatus 1a according to the first embodiment, the boost unit 601 is connected in parallel with the rectification unit 130 in the power conversion apparatus 1c according to the third embodiment. The boost unit 601 includes the rectifier elements 621 to 624 and the switching element 611. The boost unit 601 turns on and off the switching element 611 under control of the control unit 400, boosts a first alternating-current power output from the commercial power supply 110, and outputs the boosted power to the rectification unit 130. In the present embodiment, the control unit 400 performs, on the boost unit 601 of the rectification and boost unit 702, simple switching control that switches the switching element 611 one or more times in a half cycle of a frequency of the first alternating-current power supplied from the commercial power supply 110. With the boost unit 601, the power conversion apparatus 1c performs power factor improvement control for the commercial power supply 110 and causes the capacitor voltage Vdc across the capacitor 210 of the smoothing unit 200 to be higher than the power supply voltage Vs.

The control unit 400 obtains the voltage and current values of the first alternating-current power at the power supply voltage Vs from the voltage and current detection unit 501, the voltage value of the power rectified by the rectification unit 130 from the voltage detection unit 502, and the current values of the second alternating-current power with the desired amplitude and the desired phase that has been obtained as a result of the conversion by the inverter 310 from the current detection units 313a and 313b. The control unit 400 uses the detection values detected by the detection units in controlling the operation of the inverter 310 or, more specifically, the on and off switching of the switching elements 311a to 311f of the inverter 310. Moreover, the control unit 400 uses the detection values detected by the detection units in controlling the operation of the boost unit 601 or, more specifically, the on and off switching of the switching element 611 of the boost unit 601. By performing the operation controls on the boost unit 601 and the inverter 310, the control unit 400 obtains the same effects as described in the first embodiment.

The power conversion apparatus 1*c* otherwise operates similarly to the power conversion apparatus 1*a* according to the first embodiment. In this case, the power conversion apparatus 1*c* is also capable of obtaining the same effects as the power conversion apparatus 1*a* according to the first embodiment. Compared with the power conversion apparatus 1*a* according to the first embodiment and the power conversion apparatus 1*b* according to the second embodiment, the number of times the switching is performed is small in the power conversion apparatus 1*c*, thus the power conversion apparatus 1*c* enables reduced loss and reduced noise. Since the rectification unit 130 and the boost unit 601 are connected in parallel, when no switching of the switching element 611 takes place in the boost unit 601 under the condition that the switching is unnecessary, the power conversion apparatus 1*c* has a smaller number of elements for conduction, enabling reduced loss.

Fourth Embodiment

Figure 8:
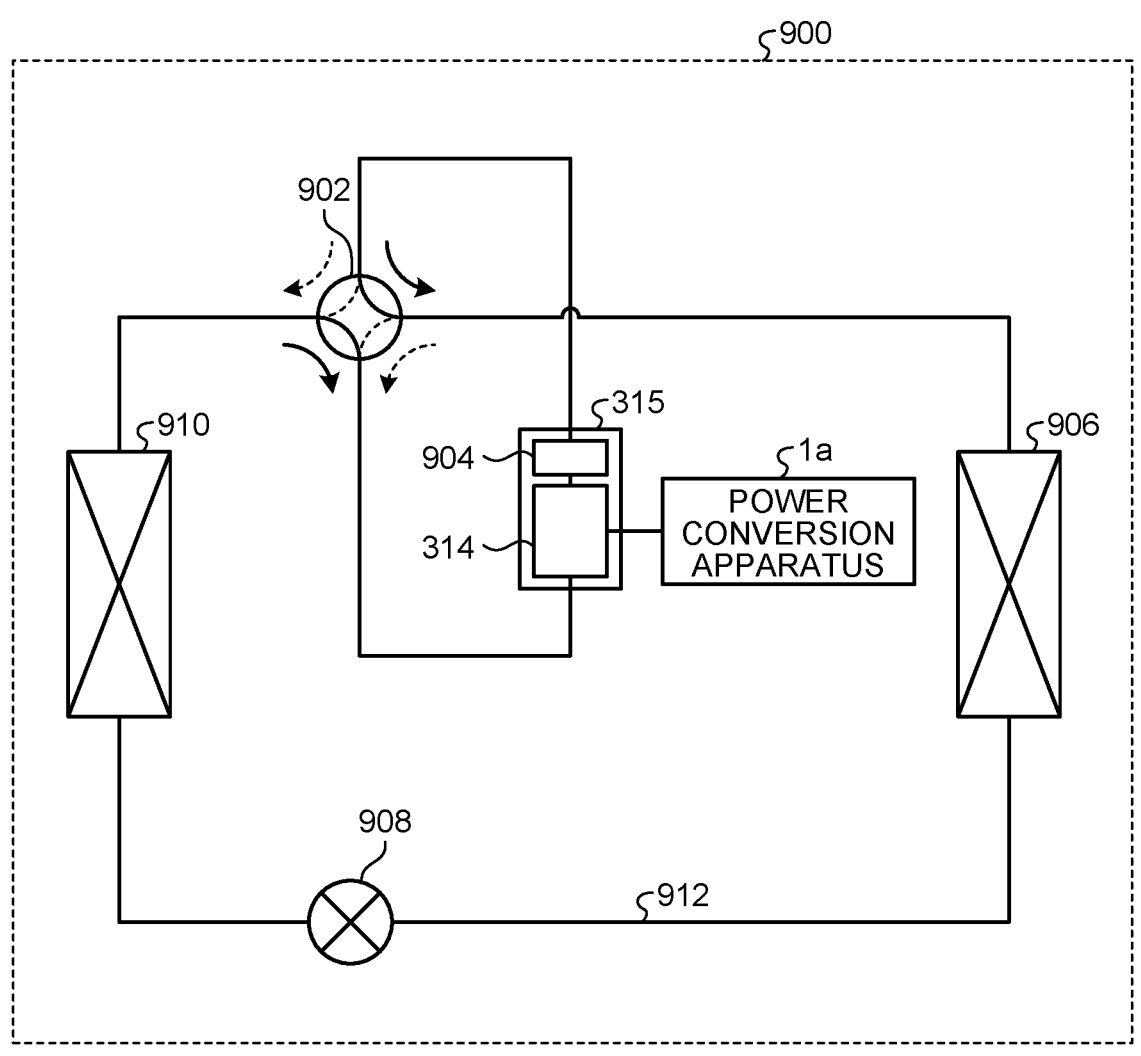
FIG. 8 is a diagram illustrating an exemplary configuration of a refrigeration cycle apparatus according to a fourth embodiment.

FIG. 8 is a diagram illustrating an exemplary configuration of a refrigeration cycle apparatus 900 according to a fourth embodiment. The refrigeration cycle apparatus 900 according to the fourth embodiment includes the power conversion apparatus 1*a* described in the first embodiment. The refrigeration cycle apparatus 900 may include the power conversion apparatus 1*b* described in the second embodiment or the power conversion apparatus 1*c* described in the third embodiment in place of the power conversion apparatus 1*a*. The refrigeration cycle apparatus 900 according to the fourth embodiment is applicable to a product with a refrigeration cycle, such as an air conditioner, a refrigerator, a freezer, or a heat pump water heater. In FIG. 8, constituent elements with the same functions as those in the first embodiment have the same reference characters as in the first embodiment.

The refrigeration cycle apparatus 900 has the compressor 315 with the internal motor 314 in the first embodiment, a four-way valve 902, an indoor heat exchanger 906, an expansion valve 908, and an outdoor heat exchanger 910 connected via refrigerant piping 912.

The compressor 315 internally includes a compression mechanism 904 that compresses a refrigerant and the motor 314 that runs the compression mechanism 904.

The refrigeration cycle apparatus 900 is capable of operating for heating or cooling through switching operation of the four-way valve 902. The compression mechanism 904 is driven by the motor 314 that is controlled at variable speed.

In the operation for heating, as indicated by solid line arrows, the refrigerant is pressurized and discharged by the compression mechanism 904 and returns to the compression mechanism 904 through the four-way valve 902, the indoor heat exchanger 906, the expansion valve 908, the outdoor heat exchanger 910, and the four-way valve 902.

In the operation for cooling, as indicated by dashed line arrows, the refrigerant is pressurized and discharged by the compression mechanism 904 and returns to the compression mechanism 904 through the four-way valve 902, the outdoor heat exchanger 910, the expansion valve 908, the indoor heat exchanger 906, and the four-way valve 902.

In the operation for heating, the indoor heat exchanger 906 acts as a condenser to release heat, and the outdoor heat exchanger 910 acts as an evaporator to absorb heat. In the operation for cooling, the outdoor heat exchanger 910 acts as a condenser to release heat, and the indoor heat exchanger 906 acts as an evaporator to absorb heat. The expansion valves 908 depressurizes and expands the refrigerant.

The above configurations illustrated in the embodiments are illustrative, can be combined with other techniques that are publicly known, and can be partly omitted or changed without departing from the gist. The embodiments can be combined together.

The invention claimed is:

1. A power conversion apparatus comprising:
a rectification and boost unit rectifying a first alternating-current power supplied from a commercial power supply and boosting a voltage of the first alternating-current power;
a capacitor connected to output terminals of the rectification and boost unit;
an inverter that is connected across the capacitor, converts power output from the rectification and boost unit and the capacitor into a second alternating-current power, and outputs the second alternating-current power to a load including a motor;
a voltage and current detection unit provided between the commercial power supply and the rectification and boost unit, and detecting a voltage value and a current value of the first alternating-current power supplied from the commercial power supply;
a voltage detection unit provided between the rectification and boost unit and the capacitor, and detecting a voltage value of power output from the rectification and boost unit;
a current detection unit provided between the inverter and the load, and detecting a current value of the second alternating-current power output from the inverter; and
a control unit configured to obtain, as detection values, the voltage value and the current value of the first alternating-current power from the voltage and current detection unit, the voltage value of the power output from the rectification and boost unit from the voltage detection unit, and the current value of the second alternating-current power from the current detection unit, perform operation control on the rectification and boost unit on the basis of the detection values, and perform operation control only on the inverter on the basis of the detection values to cause the second alternating-current power that includes a pulsation to be output from the inverter to the load such that a current on which pulsating current whose main component is a frequency component of a current flowing from the rectification and boost unit is superimposed flows into the inverter, to restrain a current that flows into the capacitor, the pulsation being based on a pulsation of power flowing into the capacitor from the rectification and boost unit,
wherein a maximum value of voltage ripple generated across the capacitor is less than twice a minimum value of the voltage ripple.

2. The power conversion apparatus according to claim 1, wherein
the control unit performs power factor improvement control on the first alternating-current power supplied from the commercial power supply and average voltage control for the capacitor through operation control of the rectification and boost unit.

3. The power conversion apparatus according to claim 1, wherein the control unit performs operation control on the inverter to cause a pulsation included in the second alternating-current power that is output from the inverter to become smaller than a pulsation of power that is output from the rectification and boost unit.

4. The power conversion apparatus according to claim 1, wherein the control unit performs amplitude and phase control on a pulsation included in the second alternating-current power that is output from the inverter to cause voltage ripple generated across the capacitor to be smaller than voltage ripple that is generated across the capacitor if the second alternating-current power that is output from the inverter does not include a pulsation based on a pulsation of power that flows into the capacitor.

5. The power conversion apparatus according to claim 1, wherein the control unit performs amplitude and phase control on a pulsation included in the second alternating-current power that is output from the inverter to cause current ripple that flows into and out of the capacitor to be smaller than current ripple that is generated through the capacitor if the second alternating-current power that is output from the inverter does not include a pulsation based on a pulsation of power that flows into the capacitor.

6. The power conversion apparatus according to claim 1, wherein the rectification and boost unit includes a rectification unit including a plurality of rectifier elements, and a boost unit including a rectifier element and a switching element that is turned on and off under control of the control unit, and the rectification unit and the boost unit are connected in series or parallel.

7. The power conversion apparatus according to claim 1, wherein the rectification and boost unit includes a plurality of switching elements that are turned on and off under control of the control unit, and a plurality of rectifier elements connected in parallel with the plurality of switching elements, respectively.

8. The power conversion apparatus according to claim 1, wherein the control unit performs operation control further on the rectification and boost unit to cause power including a variable frequency component among pulsations included in the second alternating-current power to be output from the rectification and boost unit, the variable frequency component being other than a frequency component that is double a frequency of the first alternating-current power if the first alternating-current power is single-phase or six times a frequency of the first alternating-current power if the first alternating-current power is three-phase.

9. The power conversion apparatus according to claim 8, wherein the control unit controls the variable frequency component with a command value for the commercial power supply.

10. The power conversion apparatus according to claim 8, wherein the variable frequency component is controlled by the control unit to be prevented from being up to a 40th order component that is an integer multiple of a frequency of the first alternating-current power or to be less than or equal to a specified value.

11. The power conversion apparatus according to claim 1, wherein the capacitor is an electrolytic capacitor or a film capacitor.

12. The power conversion apparatus according to claim 1, wherein the rectification and boost unit performs full-wave rectification, and a voltage generated across the capacitor assumes a shape that is not a full-wave rectified waveform of the commercial power supply.

13. A motor drive apparatus comprising the power conversion apparatus according to claim 1.

14. A refrigeration cycle apparatus comprising the power conversion apparatus according to claim 1.

* * * * *